United States Patent [19]
Budnovitch

[11] Patent Number: 6,124,808
[45] Date of Patent: Sep. 26, 2000

[54] LIGHT FIXTURE WITH OBJECT DETECTION SYSTEM

[75] Inventor: William F. Budnovitch, Parkville, Mo.

[73] Assignee: William F. Budnovitch Revocable Trust, Parkville, Mo.

[21] Appl. No.: 09/150,417

[22] Filed: Sep. 9, 1998

[51] Int. Cl.[7] .................................................. B60Q 1/48
[52] U.S. Cl. ............................ 340/932.2; 340/691.1
[58] Field of Search ............................. 340/932.2, 541, 340/565, 517, 933, 436, 567, 691.1

[56] References Cited

U.S. PATENT DOCUMENTS

| | | | |
|---|---|---|---|
| D. 269,072 | 5/1983 | Sweet et al. .......................... | D10/106 |
| D. 323,405 | 1/1992 | Kin ......................................... | D26/51 |
| D. 342,334 | 12/1993 | Vakil ...................................... | D26/51 |
| D. 357,997 | 5/1995 | Wegrzyn et al. ...................... | D26/85 |
| 3,459,961 | 8/1969 | Ravas .................................... | 307/116 |
| 4,751,624 | 6/1988 | Russo et al. ........................... | 362/276 |
| 5,004,997 | 4/1991 | Shisgal et al. ......................... | 340/436 |
| 5,036,443 | 7/1991 | Humble et al. ........................ | 362/183 |
| 5,258,899 | 11/1993 | Chen ...................................... | 362/394 |
| 5,381,323 | 1/1995 | Osteen et al. .......................... | 362/276 |
| 5,432,508 | 7/1995 | Jackson ................................. | 340/932.2 |
| 5,434,764 | 7/1995 | Lee et al. ............................... | 362/276 |
| 5,442,532 | 8/1995 | Boulos et al. ......................... | 362/276 |
| 5,504,314 | 4/1996 | Farmont ................................. | 235/384 |
| 5,523,929 | 6/1996 | Ogihara ................................. | 362/183 |
| 5,559,496 | 9/1996 | Dubats .................................. | 340/539 |
| 5,575,557 | 11/1996 | Huang et al. .......................... | 362/276 |
| 5,590,953 | 1/1997 | Haslam et al. ........................ | 362/276 |
| 5,648,906 | 7/1997 | Amirpanahi ...................... | 364/464.28 |
| 5,945,925 | 8/1999 | Budnovitch .......................... | 340/932.2 |

FOREIGN PATENT DOCUMENTS 3734486  4/1989  Germany.

*Primary Examiner*—Jeffery A. Hofsass
*Assistant Examiner*—Sihong Huang
*Attorney, Agent, or Firm*—Shughart Thomson & Kilroy P.C.; Mark E. Brown

[57] ABSTRACT

A light fixture with a detection system includes a sensor subsystem with vehicle and personnel sensors. The detection system also includes an indicator/display subsystem with empty space, moving vehicle and personnel present indicators. The detection system further includes a control subsystem mounted in the light fixture and connected to the sensor and indicator subsystems for actuating the indicators in response to the signal inputs from the sensors. Applications of the detection system in parking structures and industrial facilities are disclosed.

2 Claims, 12 Drawing Sheets

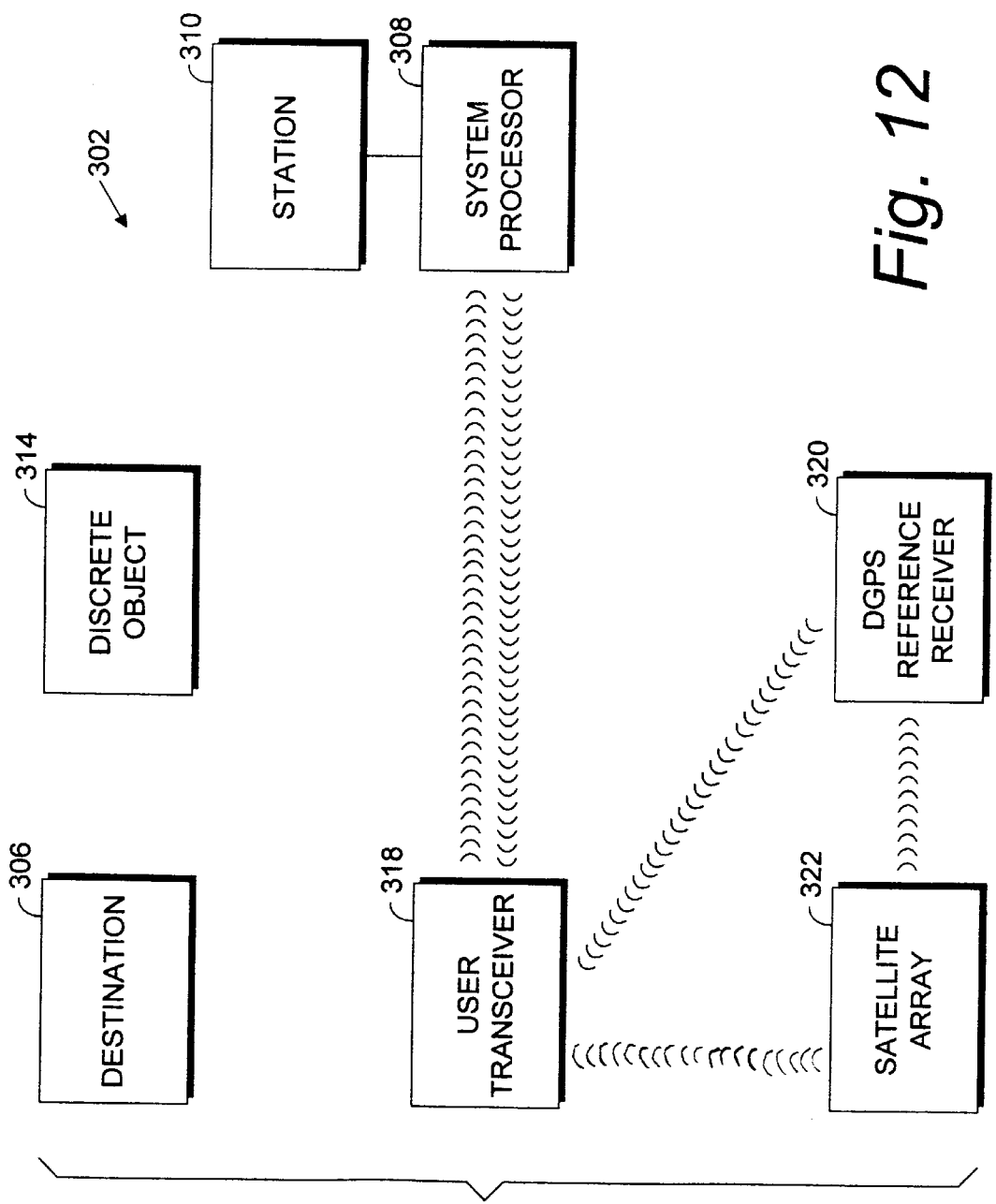

LIGHT FIXTURE WITH OBJECT DETECTION SYSTEM

BACKGROUND OF THE INVENTION

1. Field of the Invention

The present invention relates generally to security lighting, and in particular to a light fixture for a parking facility with a detection system for detecting parking space status, moving vehicles and personnel in the vicinity of the parking space.

2. Description of the Related Art

Lighting fixtures are used for environmental control, i.e., illumination, and a variety of different designs have previously been developed to meet the requirements of particular applications.

Light fixtures are commonly installed in various structures for security purposes. For example, parking garages comprise a class of structures which typically require illumination for safety and security. Since parking garages are often used during the hours of darkness, artificial illumination is desirable to reduce collision risks, enhance safety, etc. Moreover, parking garages are sometimes regarded as risky from the standpoint of personal attack. Such risks can be enhanced by the vulnerability of motorists as they enter and leave their vehicles and are thus preoccupied with retrieving vehicle keys, locking and unlocking vehicle doors, loading or unloading items in the vehicle, etc. Such activities tend to preoccupy motorists, and assailants have been known to time their attacks for such moments of vulnerability.

Another security problem with parking structures is that vehicles parked therein afford numerous hiding places for would-be assailants. Other hazards associated with parking structures include collision risks associated with vehicles entering and leaving parking spaces. For example, when a vehicle backs out of a parking space, its driver's rearward vision is often limited, thus increasing the chances of a collision with a vehicle in the drive aisle. Another common problem encountered by motorists in parking structures relates to locating available spaces. Considerable amounts of unnecessary driving often occur as motorists traverse the drive aisles in large parking structures seeking empty parking spaces.

A partial solution to safety and security issues associated with parking structures is to provide illumination by mounting light fixtures therein. However, the normal design standards for parking structure illumination require only relatively low illumination levels, e.g., about 0.5 foot candles per square foot.

Light fixtures have previously been used for security purposes by coupling them with motion detection switching systems. For example, U.S. Pat. No. 5,381,323; No. 5,434,764 and No. 5,442,532 disclose lighting fixtures with motion or proximity detectors. Such lighting fixtures can be used in areas in which illumination is desired when personnel are present. They tend to discourage intruders and would-be assailants by depriving them of the cover of darkness.

Motion sensing electronics are well known in the art. For example, the Ravas U.S. Pat. No. 3,459,961 discloses a movement responsive light control means. The Ravas '961 patent motion sensor utilizes a doppler shift in a transmitted signal frequency to detect movement and thus trigger a firing circuit, which in turn switches a load (e.g., a light) to an on condition. Other sensor systems currently available utilize sonar and infrared technology to detect objects and object movement.

Heretofore there has not been available a detection system for a light fixture with the safety and security advantages of the present invention. The present invention addresses some or all of the foregoing safety and security issues as they relate to parking structures and lighting system therefore.

SUMMARY OF THE INVENTION

In the practice of the present invention, a detection system is provided for a light fixture in a parking structure including a parking space, a drive aisle and a ceiling. The detection system includes a sensor subsystem with vehicle and personnel sensors, an indicator/display subsystem with empty space, moving vehicle and personnel indicators; and a control subsystem. The control subsystem includes memory, switching and logic units for receiving and storing data corresponding to predetermined situations and switching the indicators in response to signal inputs from the sensors.

OBJECTS AND ADVANTAGES OF THE INVENTION

The principle objects and advantages of the present invention include: providing a "smart" light fixture; providing a detection system for a light fixture; providing such a detection system which includes a vehicle detector, providing such a detection system which includes a personnel detector; providing such a detection system which is adapted for mounting in different types of light fixtures; providing such a protection system which is adapted for mounting in light fixtures installed in parking structures; providing such a detection system which is adapted for use in light fixtures installed in high bay industrial applications; providing such a light fixture which includes a programmable logic controller; providing such a detection system which can enhance safety and security in facilities where it is installed; and providing such a detection system which is economical to manufacture, efficient in operation, capable of a long operating life and particularly well adapted for the proposed uses thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 12 is a schematic diagram of a detection system comprising a third modified embodiment of the present invention and incorporating interactive global positioning system (GPS) components.

DETAILED DESCRIPTION OF THE PREFERRED EMBODIMENTS

I. Introduction and Environment

Figure 1:
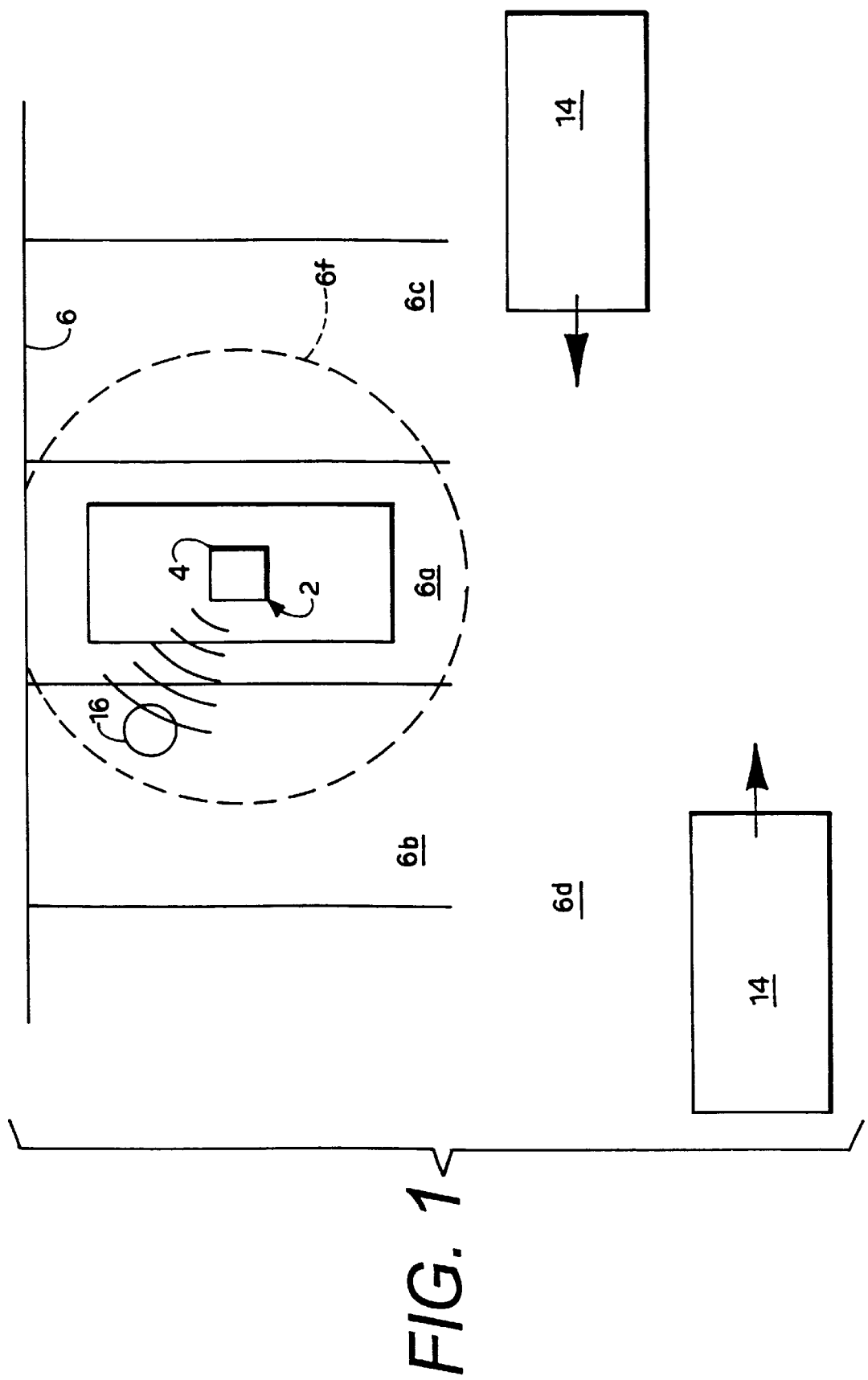
FIG. 1 is a plan view of a parking facility application of the present invention.
Figure 2:
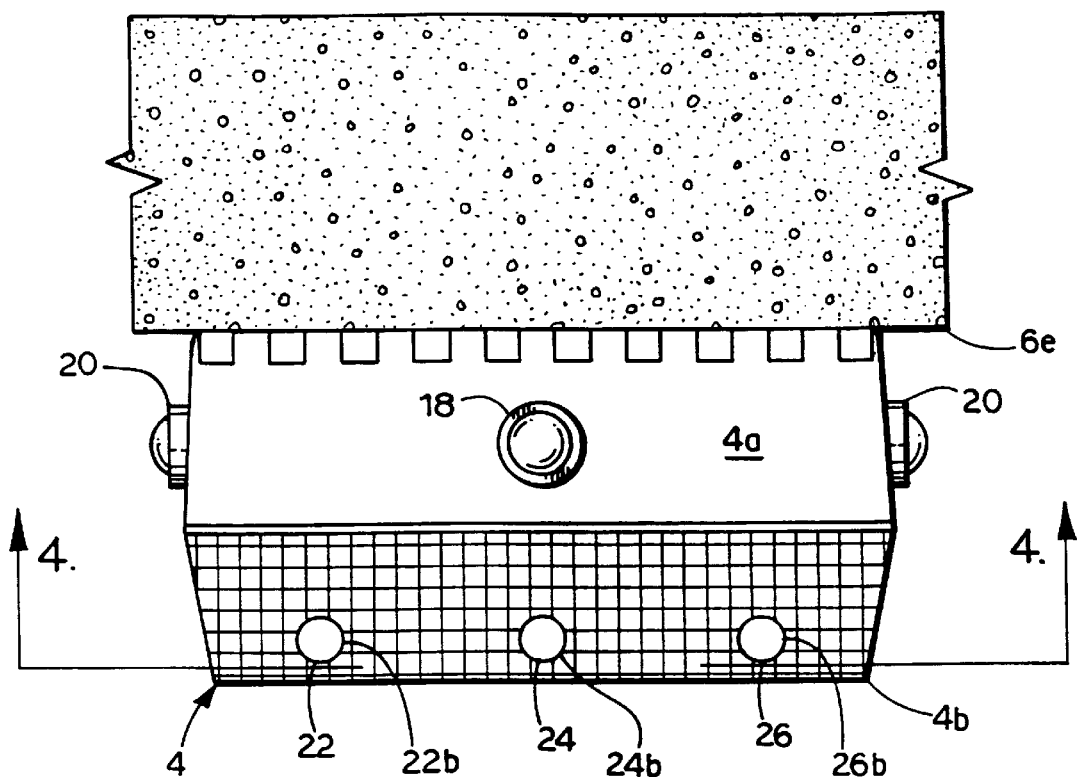
FIG. 2 is a side elevational view of the light fixture thereof, shown mounted on a ceiling of the parking facility.
Figure 3:
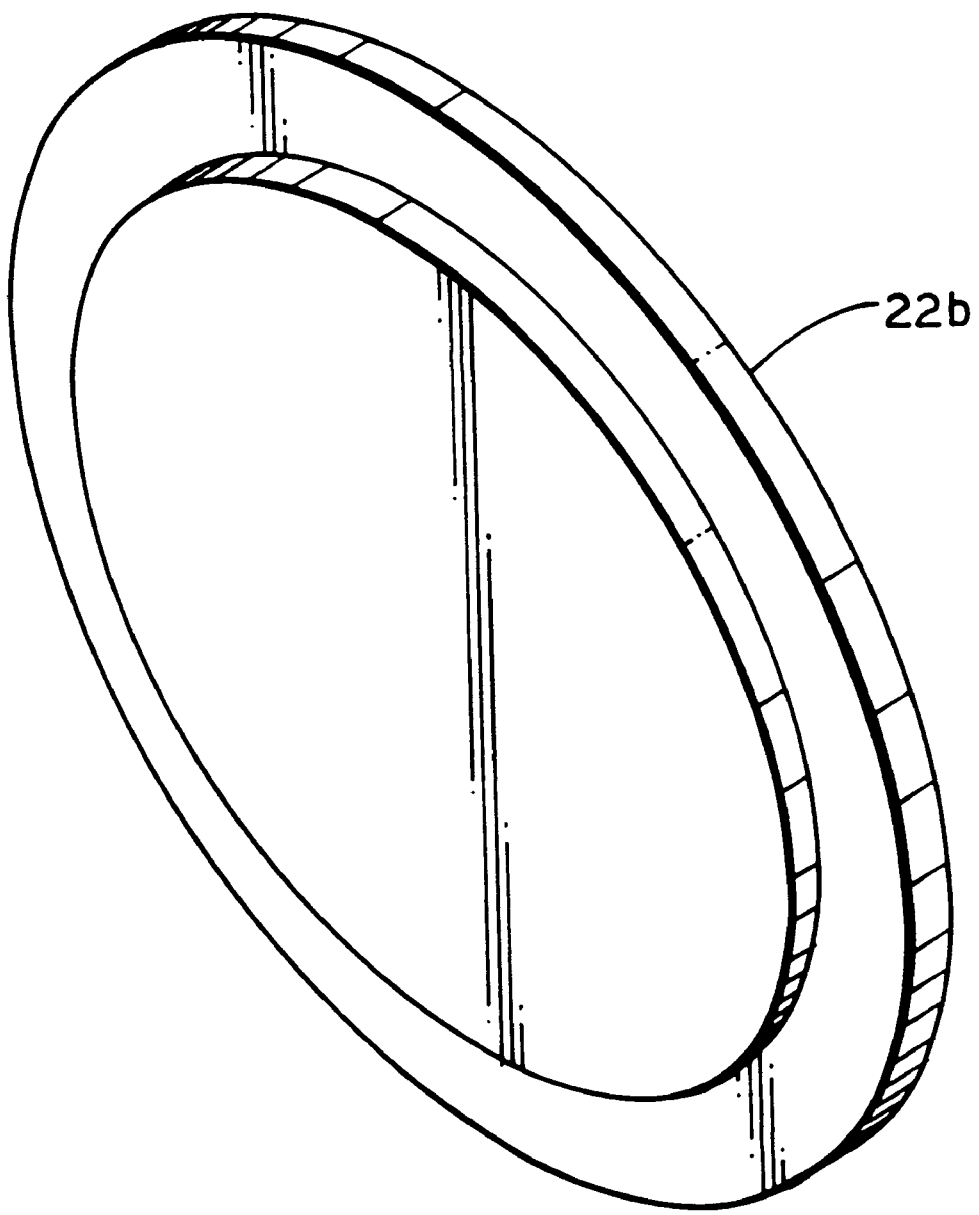
FIG. 3 is a perspective view of a fresno lens for mounting over a LED thereof.
Figure 4:
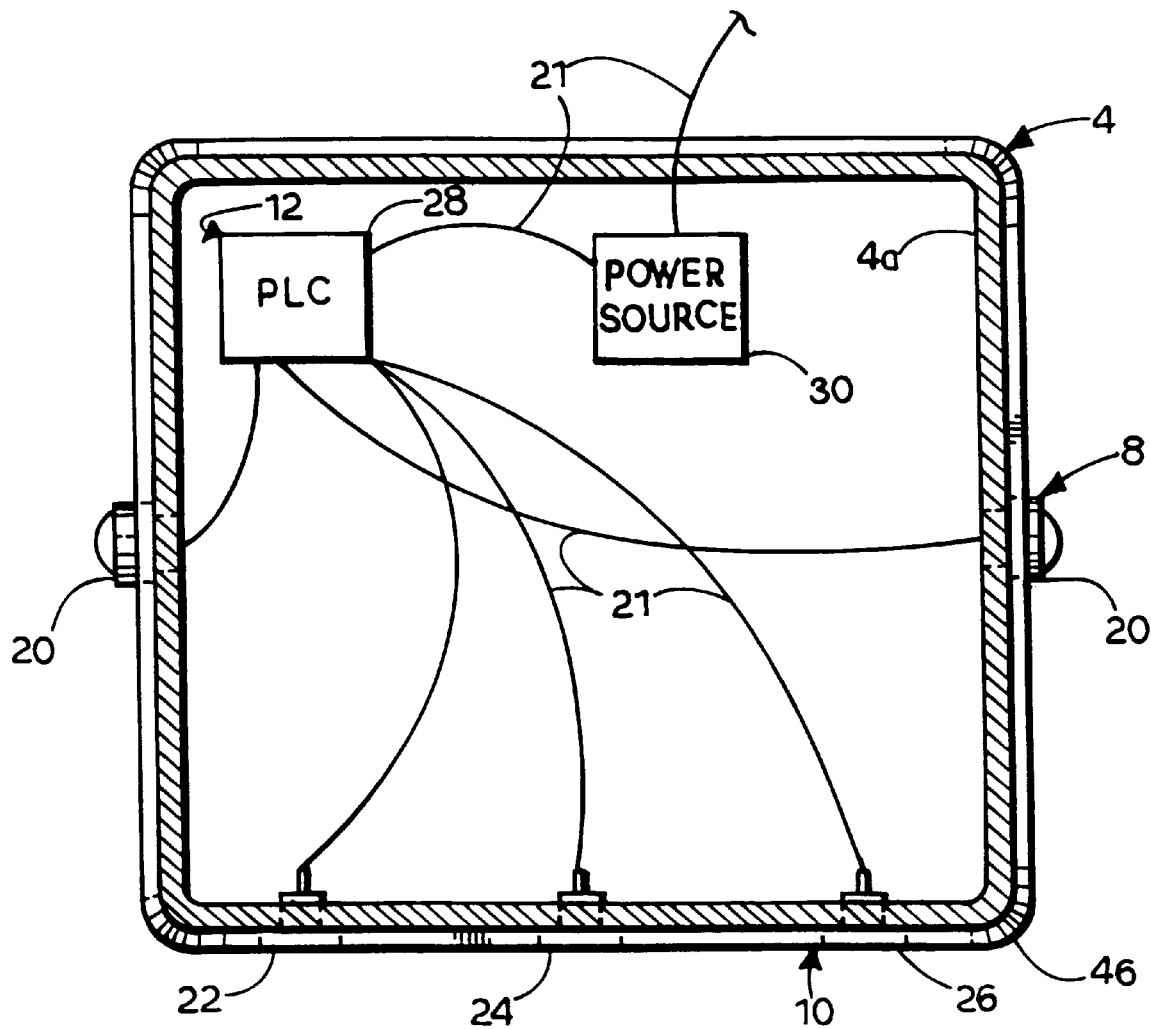
FIG. 4 is a bottom plan view of the light fixture taken generally along line 4—4 in FIG. 2 and generally shows the installation of the detection system in the light fixture.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference numeral 2 generally designates a detection system incorporated in a light fixture 4 having a base 4a and a lens 4b. Without limitation on the generality of useful applications of the detection system 2, it is shown mounted in a parking structure 6 including a plurality of parking spaces 6a,b,c; a drive aisle 6d at the ends of the parking spaces 6a,b,c; and a ceiling 6e located thereover.

The detection system 2 generally comprises a sensor subsystem 8, an indicator/display subsystem 10 and a control subsystem 12. The detection system 2 is designed to detect both vehicles 14 and personnel 16.

II. Sensor Subsystem 8

The sensor subsystem 8 includes a vehicle sensor 18 mounted on the fixture base 4a and directed at a respective parking space 6a. The vehicle sensor 18 is adapted to provide a stationary vehicle presence signal to indicate occupancy of the parking space 6a, and a moving vehicle signal to indicate movement of a vehicle 14 with respect to the parking space 6a. A personnel sensor 20 is directed to the vicinity 6f of the parking space 6a and is adapted for emitting a "person present" signal if a person 16 is detected within such vicinity 6f.

Figure 5:
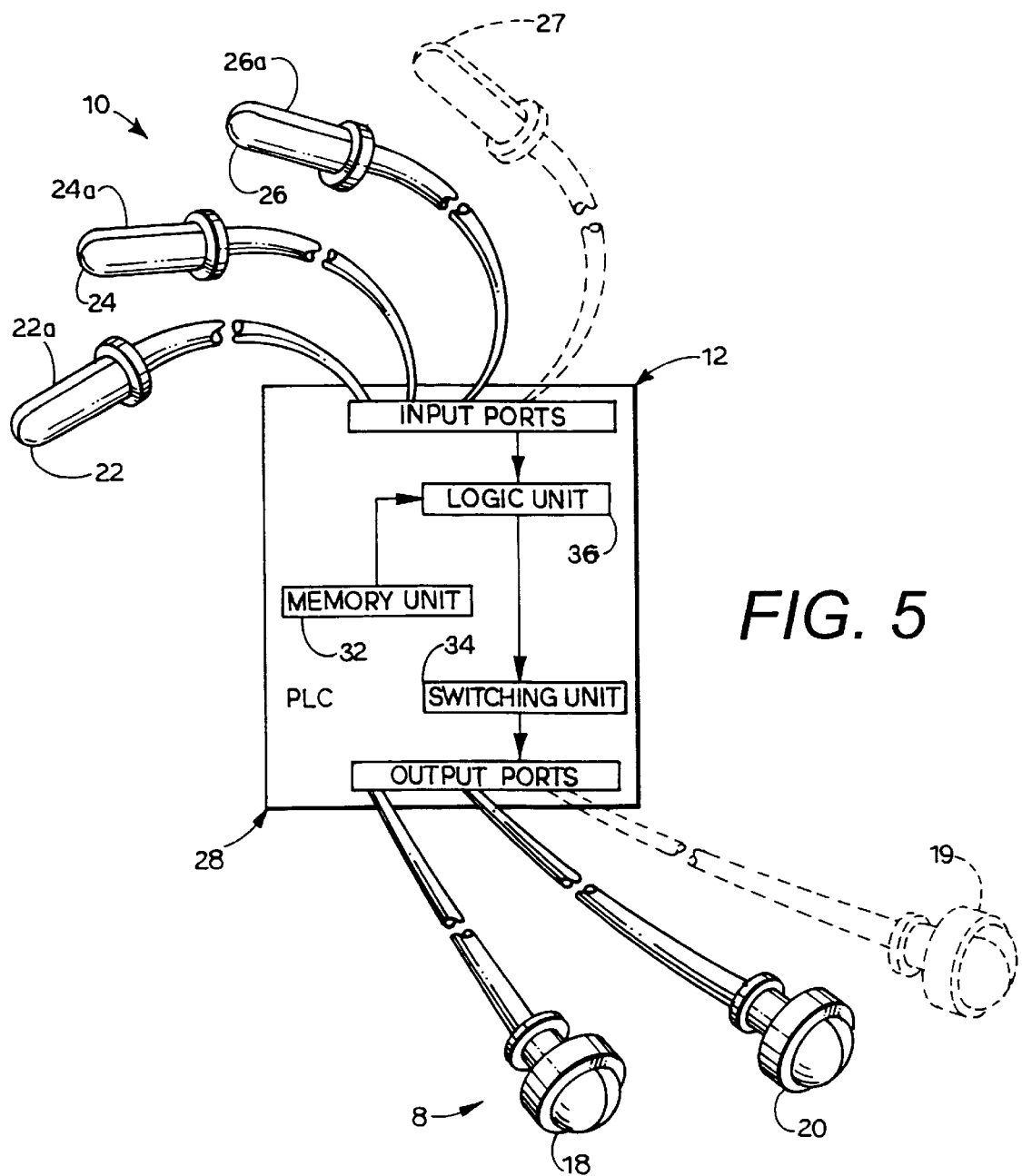
FIG. 5 is a schematic diagram of the detection system, showing a sensor subsystem, an indicator/display subsystem and a control subsystem thereof.

The vehicle and personnel sensors 18, 20 can comprise any suitable sensor. For example, infrared sensors are available for detecting movement of heat-emitting objects, such as personnel and moving vehicles. Infrared sensors could be incorporated in both the vehicle sensor 18 and the personnel sensor 20. For detection of a stationary vehicle, the vehicle sensor 18 could employ sonar to transmit and receive signals for detecting the presence of a vehicle 14 in the parking space 6a. An optional, additional sensor is shown at 19 (FIG. 5).

III. Indicator/Display Subsystem 10

The indicator/display subsystem 10 includes a space available indicator 22, a person present indicator 24 and a moving vehicle indicator 26. The indicators 22, 24, 26 can be suitably color-coded, i.e., green, yellow and red respectively. The indicators 22, 24 and 26 can include, for example, light emitting diodes (LEDs) 22a, 24a, 26a respectively. Each indicator 22, 24, 26 can also include a fresno lenses 22b (green), 24b (yellow), 26b (red) respectively, which lenses are mounted on the light fixture lens 4b immediately outside respective LEDs 22a, 24a, 26a. The fresno lenses 22b, 24b, 26b function to enlarge the illumination patterns created by the LEDs 22a, 24a, 26a for greater visibility to an approaching motorist. An optional, additional LED is shown at 27 (FIG. 5).

IV. Control Subsystem 12

The control subsystem 12 includes a programmable logic controller (PLC) 28 connected to a power source 30, which can comprise an alternating current source shared with the light fixture 4, a battery, or a combination AC and a rechargeable battery. Battery-powered capabilities for the detection system 2 have the advantage of providing emergency operation in the event of a power interruption. Thus, even if the light fixture 4 were not functioning, the detection system 2 could provide safety information to detect the presence of an intruder, a moving vehicle, etc.

The PLC 28 includes a memory unit 32, a switching unit 34 and a logic unit 36, all suitably interconnected with each other and with the sensor and indicator/display subsystems 8, 10 by suitable wiring 21. The memory unit 32 is preferably programmable to receive data corresponding to predetermined conditions, such as the types of infrared signatures to which the control system will respond, and the sonar signature of a vehicle located within the parking space 6a. A suitable source of photoelectric sensors is Banner Engineering Corporation, P.O. Box 9414, Minneapolis, Minn. 55440.

The logic unit 36 processes signals from the sensor subsystem 8 and actuates the switching unit 34 to illuminate or deilluminate the appropriate indicators 22, 24, 26. It will be appreciated that the PLC can be programmed to respond to a variety of different conditions as appropriate.

V. First Modified Embodiment Detection System 102

Figure 6:
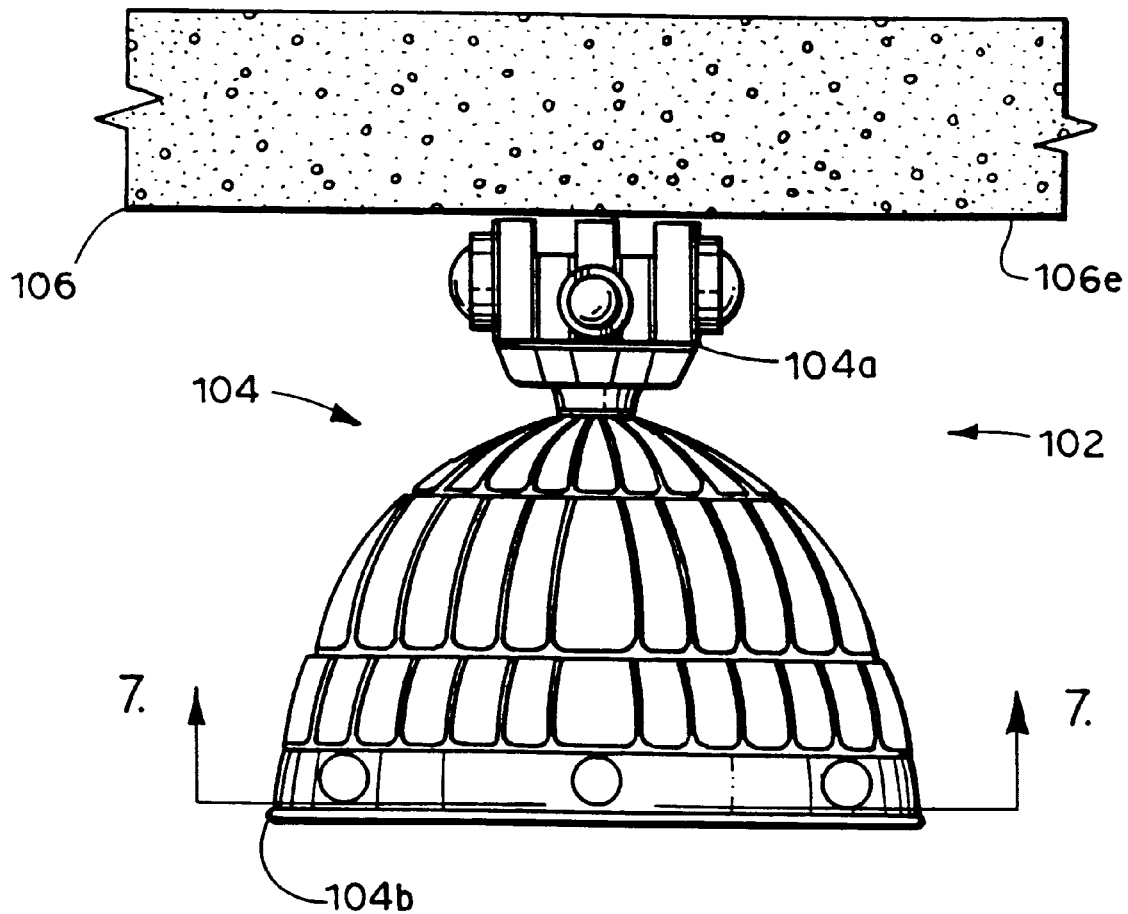
FIG. 6 is a side elevational view of a high bay industrial fixture application of a light fixture with a detection system embodying the present invention and comprising a first modified embodiment thereof.
Figure 7:
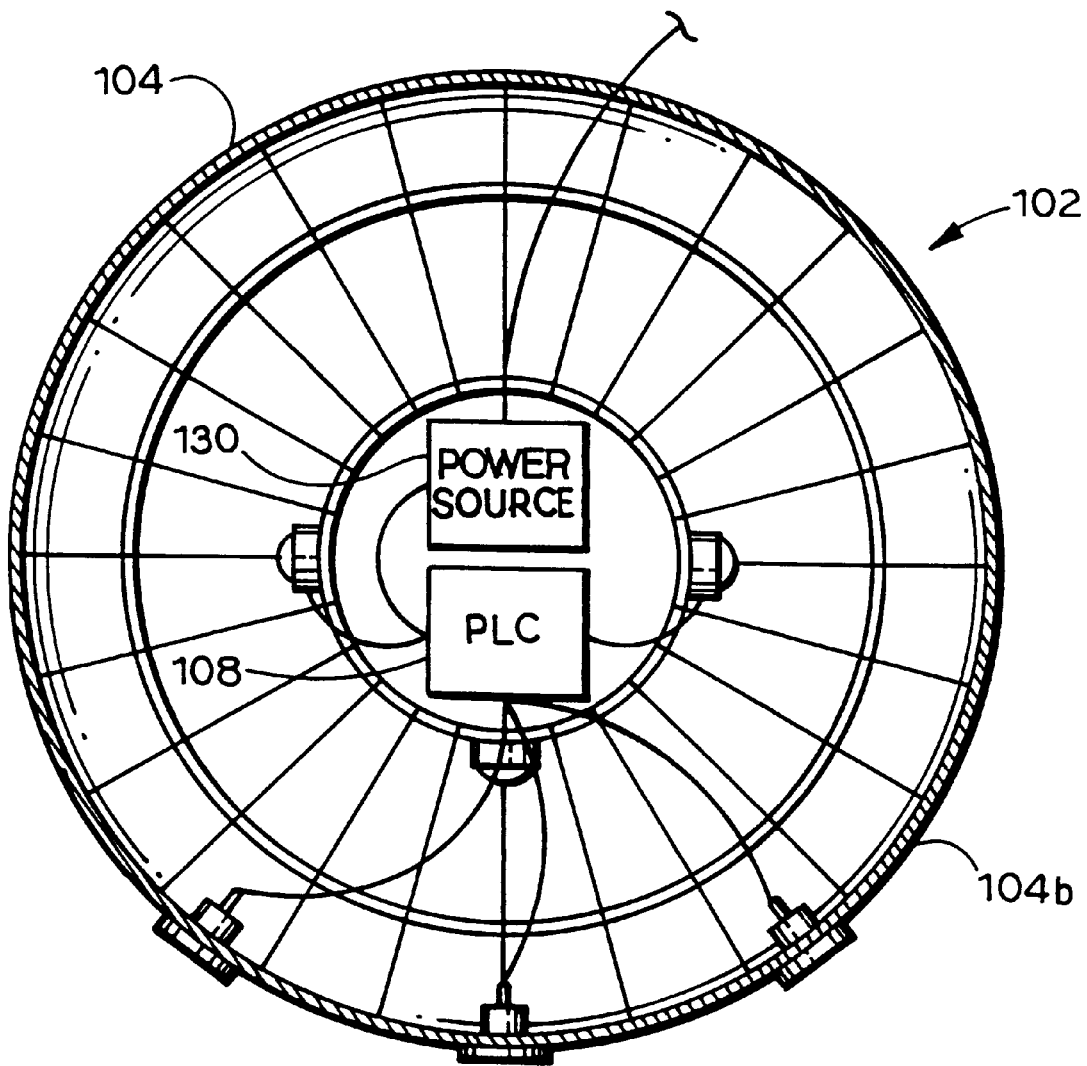
FIG. 7 is a bottom plan view thereof taken generally along line 7—7 in FIG. 6 and generally shows the installation of the detection system in the light fixture.

A detection system 102 comprising a first modified embodiment of the present invention is shown in FIGS. 6–7 and is installed in a high bay industrial type fixture 104 including a fixture base 104a mounted on the parking structure ceiling 6e and a fixture reflector 104b mounted on and depending downwardly from the fixture base 104a.

The ceiling 106e on which the fixture 104 is mounted can be located at a substantial height, e.g., 15 feet to 25 feet high. Light fixtures such as that shown at 104 are commonly used for such relatively high installations.

The detection system 102 is otherwise adapted for operating in a manner similar to the detection system 2, and includes a PLC 108 and a power source 130, similar subsystems to those described above.

VI. Second Modified Embodiment Detection System 202

Figure 8:
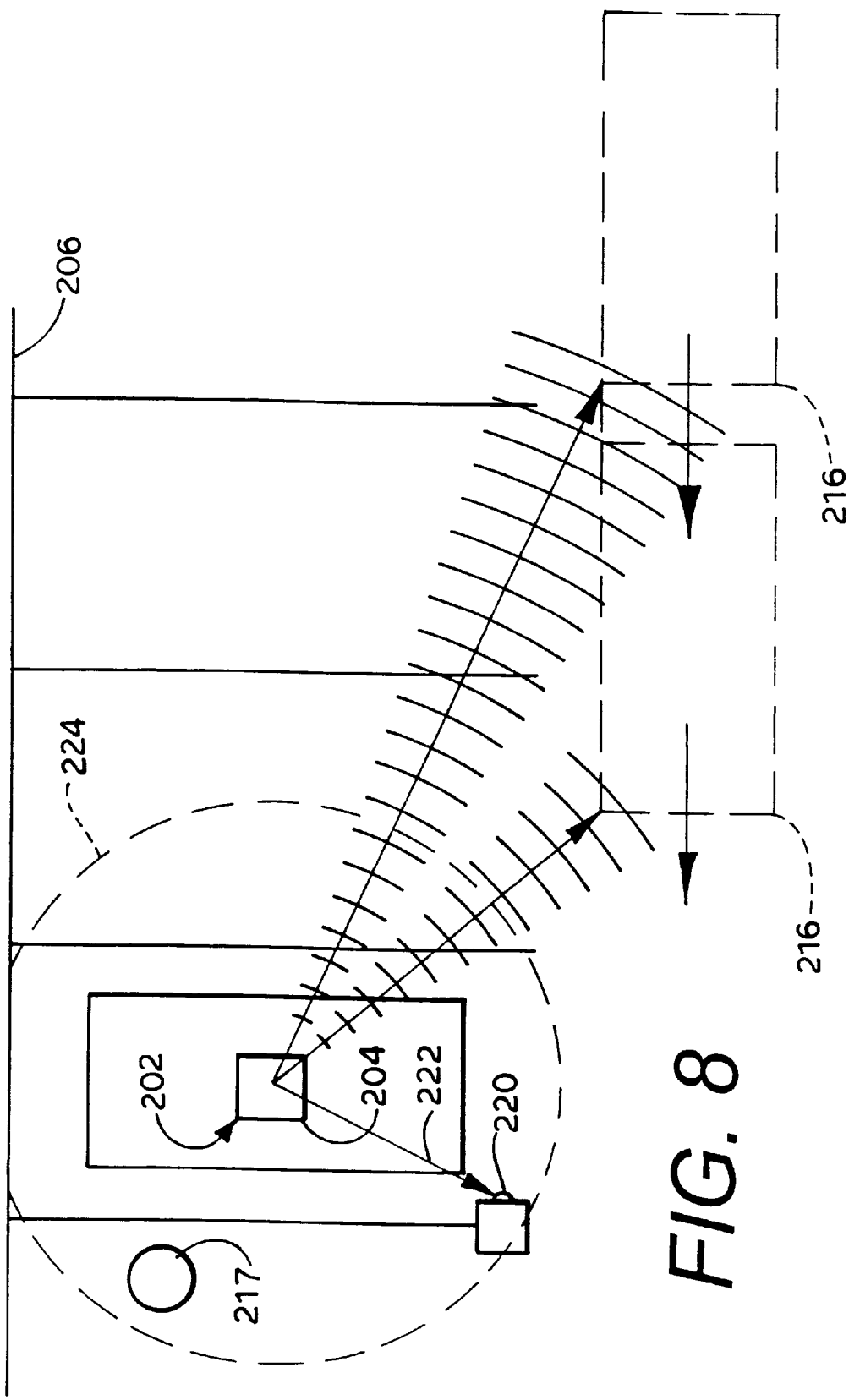
FIG. 8 is a plan view of a parking facility application of the present invention, comprising a second modified embodiment thereof.
Figure 9:
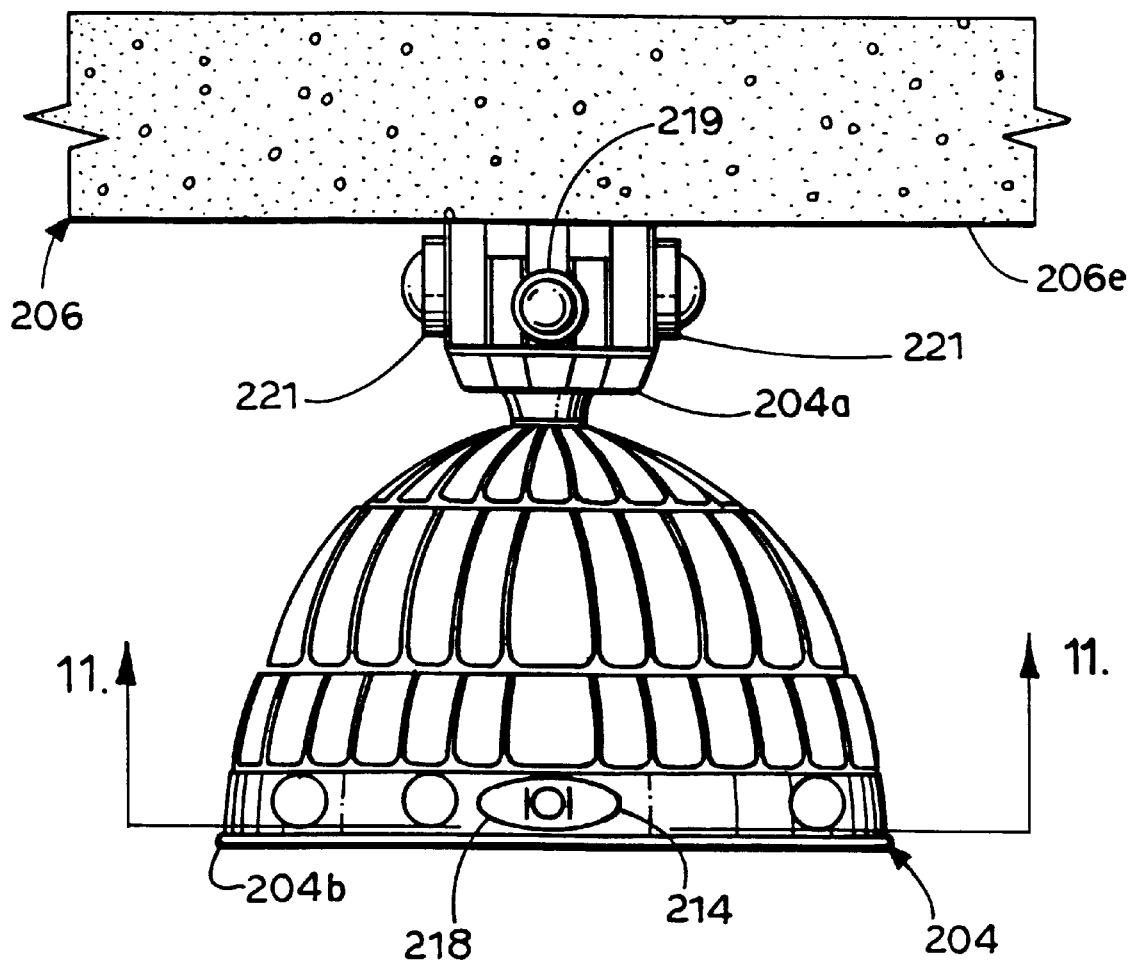
FIG. 9 is a side elevational view thereof.
Figure 10:
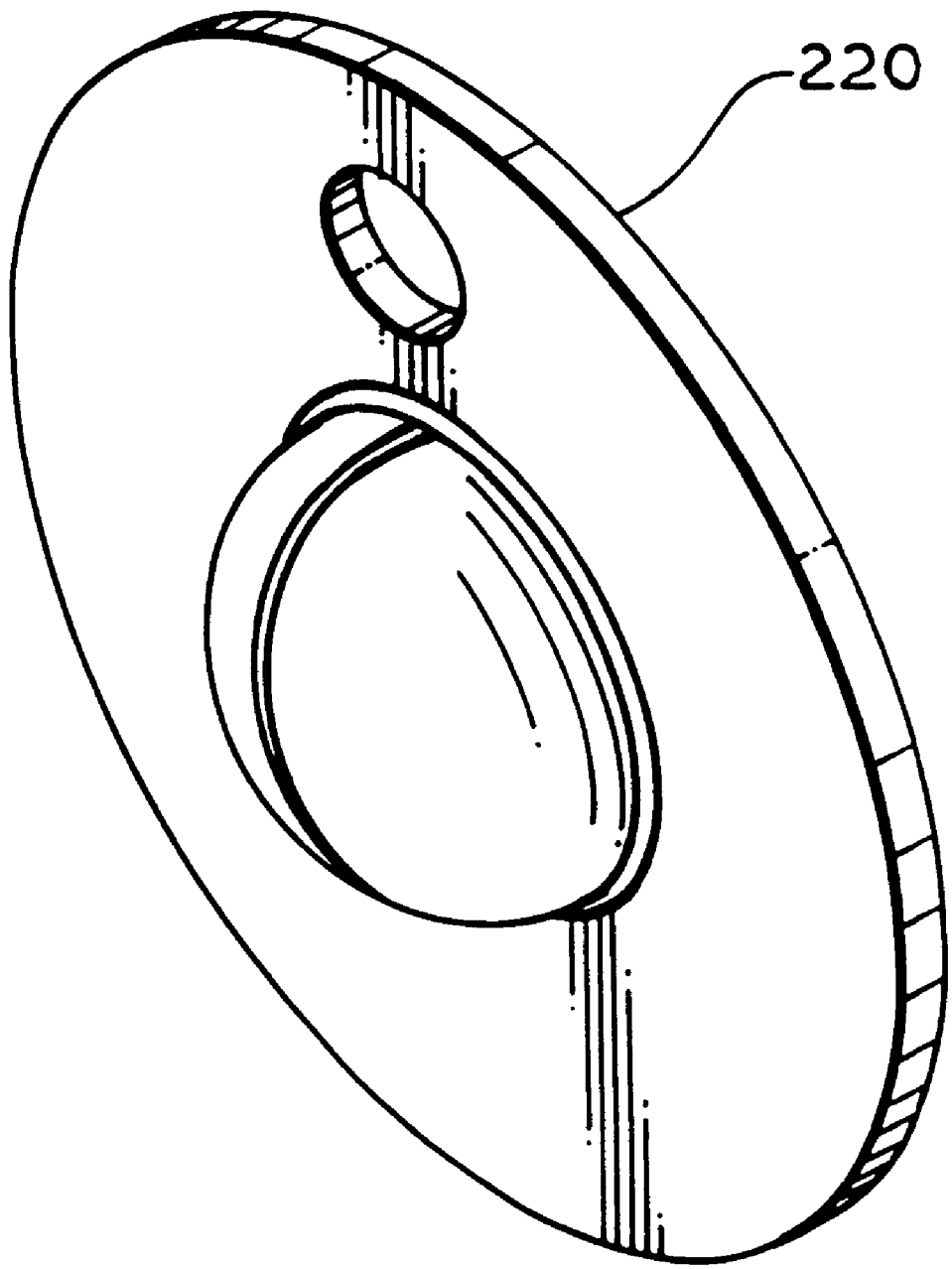
FIG. 10 is a perspective view of a laser reflector of the second modified embodiment detection system.
Figure 11:
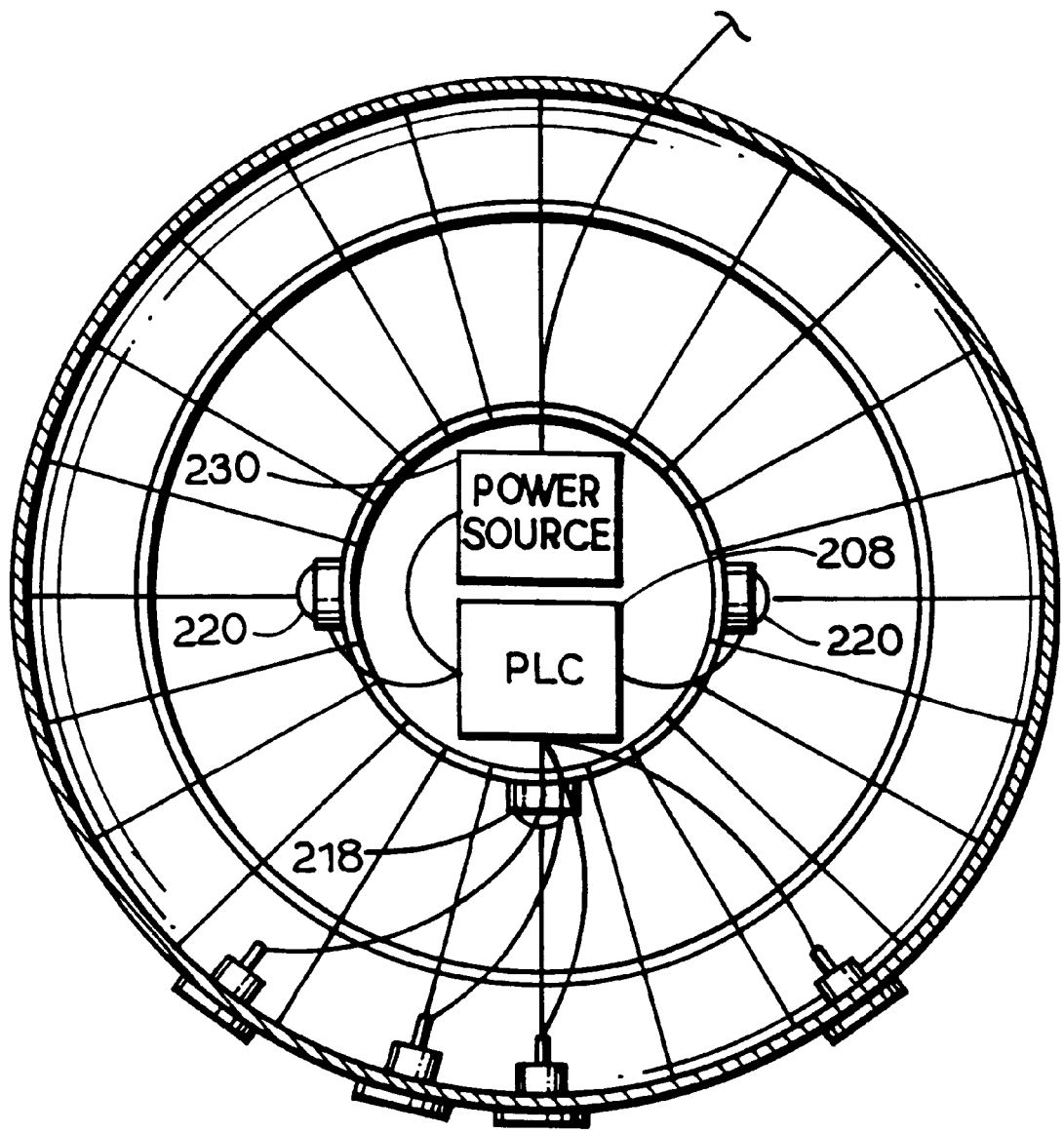
FIG. 11 is a bottom plan view of the light fixture taken generally along line 11—11 in FIG. 9 and generally shows the installation of the detection system in the light fixture.

A detection system 202 comprising a second modified embodiment of the present invention is shown in FIGS. 8–10 and is incorporated in a high bay industrial fixture 204 like the fixture 104 described above with a base 204a and a reflector 204b. The fixture 204 is adapted for mounting on a parking or industrial structure ceiling 206e, which can be located a substantial distance, e.g., 15 to 25 feet, above a floor surface. The detection system 202 includes a PLC 208, such as the PLC 8 described above with sensor, indicator/display and control subsystems, and a power source 230.

The detection system 202 includes vehicle and personnel sensors 218, 220 as described above, and also includes an approaching vehicle sensor 214. A signal from the approaching vehicle sensor 214 is processed by the detection system 202 to determine a range and speed of an approaching vehicle 216.

The PLC 208 includes a laser light source means 218 for emitting a directional laser beam 222. The detection system 202 further includes a laser reflector 220 mounted at approximately nominal visual height (e.g., about 4 to 8 feet) within the path of the laser light beam 222. The detection system 202, in addition to the functions described above, responds to the proximity of the approaching vehicle 216 when a potential hazard situation exists. For example, the detection system 202 can cause the laser light source 218 to emit a pulsating signal, visible on the laser reflector 220 to an approaching driver, when the approaching vehicle is within 25 feet. The pulsating signal can signify either a vehicle backing out of the parking space 6a, a person 216 in the vicinity 224 thereof, or both. When the approaching vehicle 216 comes within a second predetermined range, e.g., 12 to 18 feet, the detection system 202 can cause the laser light beam 222 to be emitted continuously from the laser light source 218, thus indicating that the approaching vehicle 216 should stop. When the potential hazard leaves the vicinity of the parking space 6a, the laser light source 218 would deactivate, thus signaling the approaching driver to proceed.

It is to be understood that while certain forms of the present invention have been illustrated and described herein, it is not to be limited to the specific forms or arrangement of parts described and shown.

VII. Third Modified Embodiment Detection System 302.

A detection system 302 comprising a third modified embodiment of the present invention is show in FIG. 12 and utilizes the global positioning system ("GPS") for user assistance in locating destinations, such as a parking space 306, and discrete objects 314, such as a vehicle or a person. The detection system 302 includes a system processor 308 which can be connected by any suitable means, e.g. hard-wired network or wireless, to multiple stations 310. The stations 310 can be associated with particular areas within a parking structure, and can incorporate the sensor, indicator/display and control subsystems of the detection systems 2, 102 and 202 described above.

The system processor 308 is adapted for two-way communication, through either hard-wired or wireless interfaces with a user transceiver 318 which includes differential global positioning system (DGPS) capabilities.

A preferred form of global positioning system technology involves a differential global positioning system (DGPS) which utilizes a fixed reference receiver 320, for example located in proximity to the system processor 308. The fixed reference receiver 320 receives positioning signals from one or more satellites in a satellite array 322. The satellite array 322 consists of a constellation of satellites in orbit over the earth. The satellites' positions are continually monitored for GPS reference purposes. The user transceiver 318 can accompany a visitor to or user of the facility equipped with the detection system 302, and can comprise, for example, a hand-held unit or a unit mounted in a vehicle. The user transceiver 318 can comprise a GPS navigational system of the type currently being installed in many vehicles.

In operation, the system processor 308 can store GPS coordinate information relating to predetermined locations, such as parking spaces. The system processor 308 also receives information, for example, from the stations 310, which can include GPS coordinate information for moving and transient objects, such as vehicles and personnel. The user transceiver 318 interacts with the system processor 308 to provide a user/visitor with such information as the location of available parking spaces in reference to the position of the user/visitor, as well as information concerning moving and transient objects. The user/visitor can thus effectively be guided to a destination, for example, an available parking space, by the interactive cooperation of the user transceiver 318, the system processor 308 and the stations 310. The ability of a user/visitor to receive relatively precise directions to such destinations as available parking spaces, exits from parking facilities, emergency assistance, etc. has the potential for making facilities more convenient and safe to large numbers of users/visitors.

Emergency assistance features can also be incorporated into the detection system 302. For example, the system 302 can accomodate interaction between the system processor 308 and emergency services, such as medical emergency, police and fire departments. Thus, the location of an emergency situation or the origin of an emergency assistance request from a user transceiver 318 can be instantly relayed to appropriate emergency assistance personnel. By equipping emergency personnel with compatible GPS navigational equipment, response times can be shortened and emergency assistance services can be significantly improved.

*Differential GPS Explained and GPS—A Guide to the Next Utility,* by Trimbel Navigational Limited, Sunnyvale, Calif. 94088-3642 (1993) are incorporated herein by reference.

What is claimed and desired to be secured by Letters Patent is as follows:

1. A detection system for a plurality of light fixtures mounted on the ceiling of a multi-space parking facility for illuminating same, which includes:

a) a sensor subsystem mounted on each light fixture and including a motion sensor;

b) an indicator subsystem mounted on each light fixture and including an indicator having on and off conditions, said on condition indicating the availability of at least one parking space from among a plurality of parking spaces in the vicinity of said light fixture;

c) a control subsystem connected to the sensor and indicator subsystems and including switching means for switching each said indicator between its on and off conditions in response to an input from said sensor subsystem;

d) said control subsystem including global positioning system (GPS) coordinate storage means for storing the global positioning system (GPS) coordinates of a plurality of predetermined locations each associated with a respective light fixture and interactive communication means for interactively communicating with a user global positioning system (GPS) transceiver with reference to said predetermined location;

e) a plurality of stations each associated with a respective light fixture and including means for communicating with said control subsystem; and f) said control subsystem including a system processor including an interface for interactively communicating with said user GPS transceiver.

2. The detection system according to claim 1, which includes:

a) a differential global positioning system (DGPS) fixed reference receiver associated with said control subsystem and adapted for interacting with said user (GPS) transceiver.

* * * * *